P. B. DELANY.
TELEGRAPHY.
APPLICATION FILED DEC. 31, 1908.

1,011,925.

Patented Dec. 19, 1911.
2 SHEETS—SHEET 1.

Witnesses:
Inventor
Patrick B. Delany

P. B. DELANY.
TELEGRAPHY.
APPLICATION FILED DEC. 31, 1908.

1,011,925.

Patented Dec. 19, 1911.

Witnesses:

Inventor
Patrick B. Delany
By his Attorney
Edward C. Davidson

UNITED STATES PATENT OFFICE.

PATRICK B. DELANY, OF SOUTH ORANGE, NEW JERSEY, ASSIGNOR TO THE TELEPOST COMPANY, OF NEW YORK, N. Y., A CORPORATION OF MAINE.

TELEGRAPHY.

1,011,925. Specification of Letters Patent. Patented Dec. 19, 1911.

Application filed December 31, 1908. Serial No. 470,213.

*To all whom it may concern:*

Be it known that I, PATRICK B. DELANY, a citizen of the United States of America, residing in South Orange, in the county of Essex and State of New Jersey, have invented certain Improvements in Telegraphy, of which the following is a specification.

My invention relates more particularly to automatic chemical recording telegraphs, and is especially designed for the neutralization of capacity effects or "tailing" in the record at the receiving station, and also for indicating on the record the exact location and number of signal impulses by recording in another line a short dot impulse from a source of induction connected to the line during transmission of signals.

I am aware that induced currents have been employed for the purpose of neutralizing static capacity effects in a line, but no record of these impulses has been made to form a part of the telegraphic record. Over a line of but slight electrostatic capacity the induced current record would not be necessary, and over lines of very high electrostatic capacity complete neutralization of static effect by induction is difficult, especially if all the induced current must be produced at the transmitting station where it can be conveniently put in during transmission and removed during reception of messages, and also regulated to the condition of the circuit. The generation of a very powerful induced current under such circumstances causes a corresponding diversion of the currents from the signal impulse and at the same time creates prohibitive sparking at the contact points of the transmitter. Therefore, the best results are obtained by regulating the power of the induced current to a point that will make ample definition in the record and at the same time emphasize the signals by recording the induced impulses. As these induced impulses are not recorded in the same line as are the impulses which generate them, they cannot, by reason of their small and sharp outline, under any circumstances be mistaken for regular signal impulses. Furthermore, as the induced impulse follows the signal impulse immediately upon breaking of the current it is, over a line with high capacity, recorded before the record of the signal impulse can be extended by the static current, because as soon as the static current drops to a point below the power of the induced impulse the latter prevails in the record, although (probably by local electrochemical action caused by the signal impulse) the record may continue in constantly diminishing volume until the next signal is reached. This extension of the record is ignored in transcription, as the induced dot has fixed the boundary of each signal impulse. It will be understood that the inductance J is charged at the same time that the signal impulse is sent into the line and that when contact is broken at the transmitter the induced current from J follows the signaling current and, being of opposite polarity, neutralizes to the extent of its strength the static current discharging from the line. If the induced current is more powerful than the static discharge, which is the intention in this invention, that portion of the induced current remaining after neutralization of the static current is recorded on the receiving tape in a position opposite the last recorded signal impulse. The application of this method of recording requires that both line and earth must be connected to recording fingers on one side of the chemically prepared tape. In this way the method is applicable to transmission of long and short impulses perforated in one line, or uniform impulses perforated in separate lines on the transmitting tape, and also for character impulses represented by two perforations, or for impulses represented by single perforations, the dots in one line and the dashes in another. The recorder may have one or more recording wires representing the line, or earth, such as shown in my Patent No. 541,967 granted July 2, 1895 where the dashes were formed in duplicate from single uniform impulses and the dots recorded singly in a line between the dash lines.

In the accompanying drawing: Figure 1 is a diagrammatic view showing automatic transmission from one station to another; Fig. 2, a diagram showing a record of transmitted signals; Fig. 3, a diagrammatic view showing an arrangement of the receiving or recording devices; and Figs. 4, 5, 6 and 7 are views showing different records of received signals.

Fig. 1 represents transmitter T at station X and receiver R at station Y. The dots are in the upper row of signals perforated in transmitting tape $t$, and the dashes in the lower row. Dots are sent from positive pole of battery B and the dashes from the negative. J, represents the source of inductance and $R^h$ the adjustable resistance for same. At station Y the line is connected to the middle recording finger $g$, while the forked finger $f$ is connected to ground. By this arrangement the dashes are recorded in duplicate, the dots in single line, as shown in Fig. 2.

It will be seen in the figures that the induction dots terminating the dashes are in the dot line and those marking the finish of dots are recorded in the dash line.

Figures 1, 2:
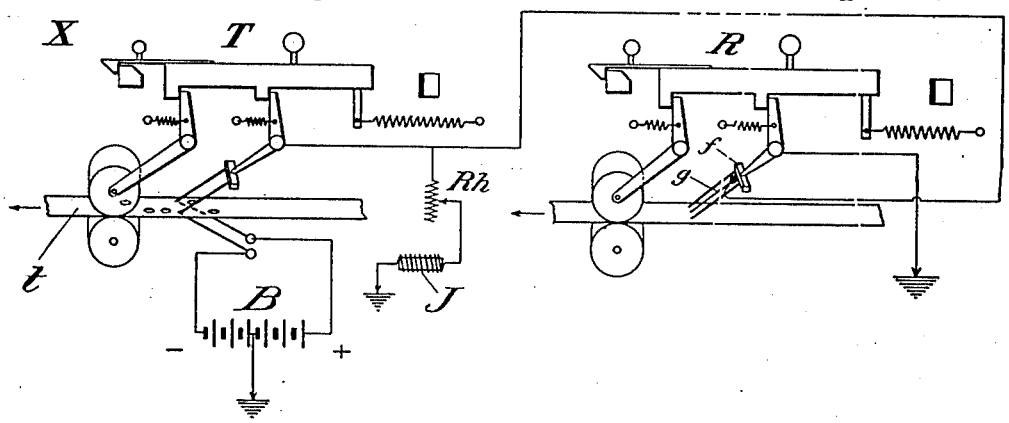
Fig. 2 represents a record over a line with slight electrostatic capacity showing the effect of induced impulses on the record.
Figures 3, 4, 5, 6, 7:
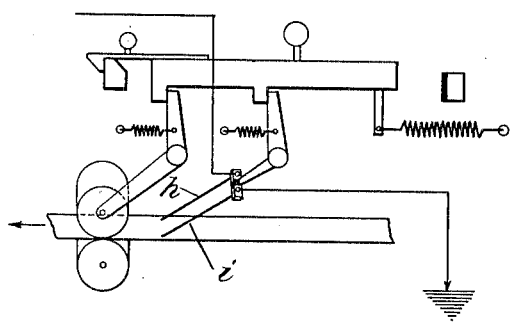
Fig. 3, represents the recorder with two recording fingers, the upper one $h$ for dots, the lower one $i$ for dashes.
Fig. 4 represents a record received over a line of practically no electrostatic capacity, and requiring no induced impulses for demarcation.
Fig. 5 represents a line with much static capacity.
Fig. 6 represents a record with two recording fingers, one for dots and one for dashes and a line of no capacity.
Fig. 7 represents the same arrangement of record over a line of great electrostatic capacity.

Figs. 5, 6 and 7 show that the induced currents not only outline the signal impulses in the record but may be used as a part of a duplicate record by recognizing as dots the small induction impulses accompanying the dot impulses, and the regularly transmitted dash signal impulses as dashes. In this way a duplicate record of all signals is plainly shown on the tape and the difference in position of the regular dots and dashes and the disparity in size between the primary signaling impulse and the induced impulses insures against error in transcription.

I claim:

1. In automatic telegraphy, a method of transmitting and recording, which consists in creating currents of opposite polarity, one a primary signaling current and the other an induced current generated by the primary current, and making a record of both currents.

2. In automatic telegraphy, a method of transmitting and recording which consists in transmitting a signal impulse, at the same time creating an induced impulse, recording the signal impulse and recording the induced impulse after the commencement of the record of the signal impulse.

3. In automatic telegraphy, the method of transmitting and recording, which consists in producing and transmitting primary impulses and induced impulses and forming a record by the primary impulses, and a duplicate record partly by the primary and partly by the induced impulses.

4. In automatic telegraphy a method of operation consisting in transmitting impulses of one polarity for dots, transmitting impulses of opposite polarity for dashes, transmitting an inductively produced impulse after each dot and each dash impulse, recording the dot impulses in one line, the dash impulses in another line and recording the induced impulse following the dot in the dash line and the induced impulse following a dash in the dot line to form a record.

5. In automatic telegraphy, a perforated tape, a transmitter for the characters on said tape, a chemical tape, a recorder for said chemical tape, means for transmitting primary currents of opposite polarity, means controlled by said primary currents for generating induced currents, and means for recording said primary currents and induced currents on said chemical tape to mark and outline the signal characters.

In testimony whereof, I have hereunto subscribed my name.

PATRICK B. DELANY.

Witnesses:
L. F. BROWNING,
E. F. WICKS.

---

Copies of this patent may be obtained for five cents each, by addressing the "Commissioner of Patents, Washington, D. C."